(12) United States Patent
Lestander

(10) Patent No.: US 9,642,345 B2
(45) Date of Patent: May 9, 2017

(54) GUIDE LIP FOR FISHING LURES AND BAIT

(71) Applicant: Dan Lestander, Lulea (SE)

(72) Inventor: Dan Lestander, Lulea (SE)

(73) Assignee: HEADBANGER LURES AB, Luleå (SE)

( * ) Notice: Subject to any disclaimer, the term of this patent is extended or adjusted under 35 U.S.C. 154(b) by 0 days.

(21) Appl. No.: 14/437,355

(22) PCT Filed: Oct. 18, 2013

(86) PCT No.: PCT/SE2013/000159
§ 371 (c)(1),
(2) Date: Apr. 21, 2015

(87) PCT Pub. No.: WO2014/065737
PCT Pub. Date: May 1, 2014

(65) Prior Publication Data
US 2015/0264905 A1    Sep. 24, 2015

(30) Foreign Application Priority Data

Oct. 22, 2012   (SE) ...................................... 1200649

(51) Int. Cl.
*A01K 85/00*     (2006.01)
*A01K 85/14*     (2006.01)
(Continued)

(52) U.S. Cl.
CPC .............. *A01K 85/14* (2013.01); *A01K 83/06* (2013.01); *A01K 85/00* (2013.01); *A01K 85/18* (2013.01)

(58) Field of Classification Search
CPC ..................................................... A01K 85/18
(Continued)

(56) References Cited

U.S. PATENT DOCUMENTS 2,012,786 A    8/1935  Hoage
2,394,132 A *  2/1946  Henry .................... A01K 85/14
                                                   43/42.5
(Continued)

FOREIGN PATENT DOCUMENTS

DE    102010047372 A1   4/2012
FR         2652991      4/1991
(Continued)

OTHER PUBLICATIONS

International Searching Authority, "Search Report", issued in connection with PCT patent application No. PCT/SE2013/000159, mailed on Mar. 2, 2014, 5 pages.
(Continued)

*Primary Examiner* — Kristina Junge
(74) *Attorney, Agent, or Firm* — Hanley, Flight & Zimmerman, LLC

(57) ABSTRACT

The present invention relates to guide lip (1) designed to be connected with an articulated point of attachment to a fishing lure or similar including a spoon-shaped body (2), one first attachment device (3) and one second attachment device (4), forming a conceived axle (6), and that the guide lip includes a first wing and a second wing which during movement of the guide lip through the water essentially directs the water in the direction toward a water conveying edge (9) positioned on the guide lip's top part above the conceived axle, or bottom part below the conceived axle. The angle between a line (16) that is parallel with the said conceived axle (6) and a line that stretches from the water conveying edge and through a position (13) on the guide lip's front side that lies on one-third the distance between the water conveying edge and the guide lip's opposite edge (10), as seen from the water conveying edge, is greater than 90 degrees. The present invention provides the possibility of
(Continued)

creating wobblers, bait holders and spoon lures with a loosely connected guide lip.

14 Claims, 16 Drawing Sheets

(51) Int. Cl.
 *A01K 83/06* (2006.01)
 *A01K 85/18* (2006.01)
(58) Field of Classification Search
 USPC .......................................................... 43/42.03
 See application file for complete search history.

(56) References Cited

U.S. PATENT DOCUMENTS

| | | | | |
|---|---|---|---|---|
| 2,836,922 A | | 6/1956 | Cox | |
| 2,780,884 A | * | 2/1957 | Hadfield | A01K 85/14 43/42.19 |
| 3,238,660 A | * | 3/1966 | Pcola | A01K 85/14 43/42.03 |
| 3,497,986 A | * | 3/1970 | Bianco | A01K 85/14 43/42.5 |
| 3,815,275 A | | 6/1974 | Amundson | |
| 4,468,879 A | * | 9/1984 | Anson | A01K 85/14 43/42.06 |
| 4,658,535 A | * | 4/1987 | Anderson | A01K 85/14 43/42.33 |
| 4,807,388 A | | 2/1989 | Cribb | |
| 4,959,920 A | | 10/1990 | Walker | |
| 5,216,830 A | * | 6/1993 | Brott, II | A01K 85/00 43/42.39 |
| 5,893,232 A | | 4/1999 | Horton et al. | |
| 5,918,406 A | | 7/1999 | Wilson | |
| 5,934,007 A | * | 8/1999 | Ellestad | A01K 85/16 43/42.06 |
| 6,301,823 B1 | * | 10/2001 | Monticello | A01K 85/14 43/42.09 |
| 7,107,720 B2 | | 9/2006 | Burggrabe et al. | |
| 7,895,789 B2 | * | 3/2011 | Langer | A01K 85/00 43/42.09 |
| 8,806,802 B2 | * | 8/2014 | Jones | A01K 85/01 43/17.1 |

FOREIGN PATENT DOCUMENTS

| | | |
|---|---|---|
| GB | 190815106 A | 10/1908 |
| GB | 745508 A | 2/1956 |
| JP | 2005210951 A | 8/2005 |
| SE | 1200649 A1 | 4/2014 |
| WO | 2014065737 A1 | 5/2014 |

OTHER PUBLICATIONS

European Patent Office, "Extended European search report" issued in connection with application EP 13848217.9, May 11, 2016, 9 pages.

* cited by examiner

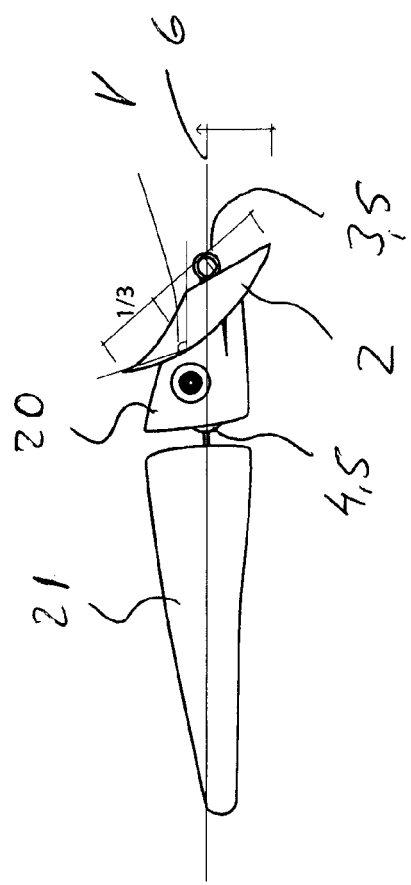

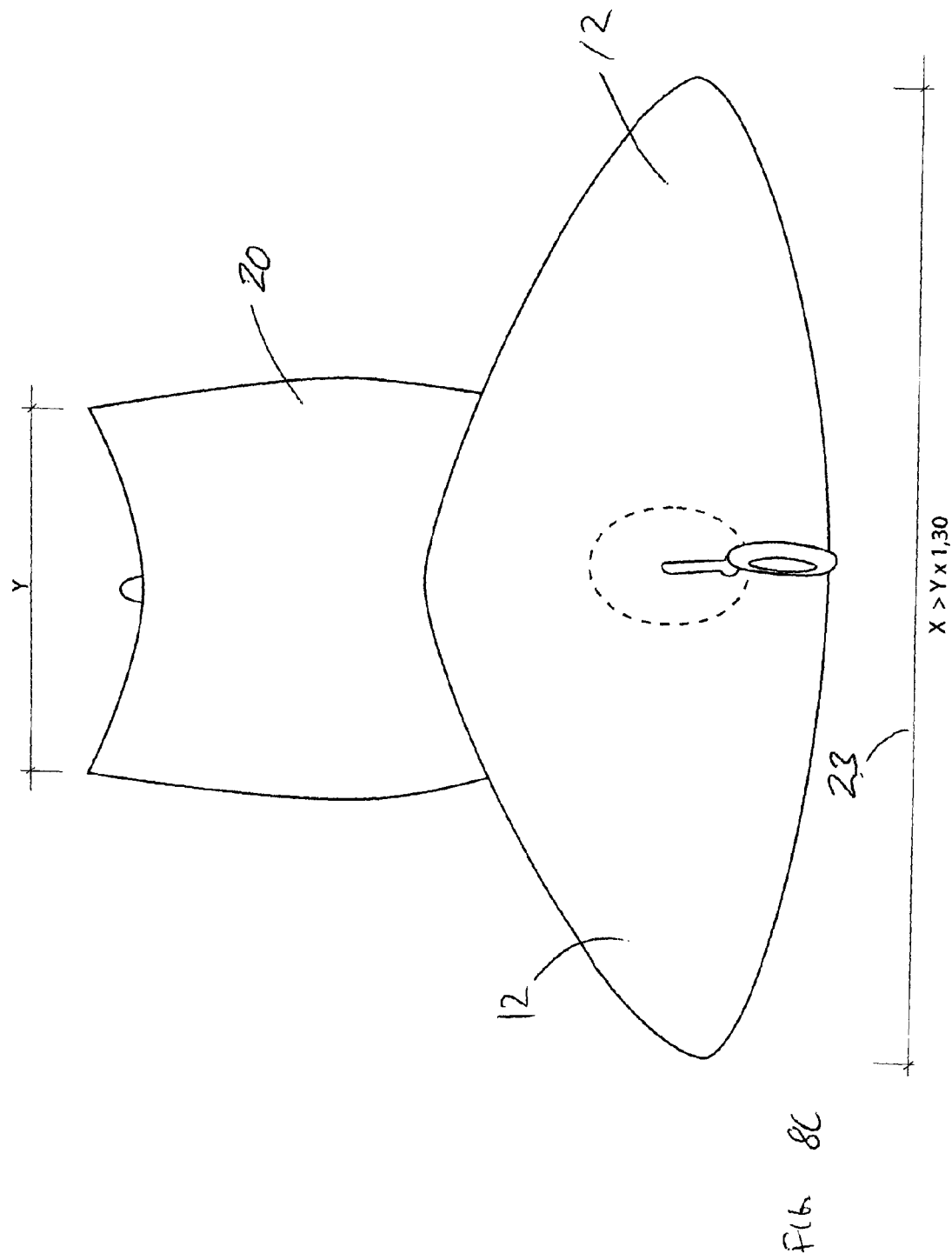

GUIDE LIP FOR FISHING LURES AND BAIT

FIELD OF THE INVENTION

The present invention concerns a guide lip for fishing lures and bait in accordance with the claims.

Background of the Invention and Prior Art

Over the years a large number of different types of fishing gear and artificial fishing bait have been created. For example fishing lures of the plug type, often called wobblers (crankbait, minnow, shallow-diver, deep-diver) with or without a so called dive lip have been created in several different variants and shapes. Wobblers with dive lips that are currently found on the market utilize a permanent lip positioned under the chin area on the front part of the wobbler.

The wobbler's lip is usually of a permanently mounted type, but may even be adjustably arranged in relation to the body of the wobbler.

Most known types of fishing lures with dive lips, such as wobblers often have a problem with a repetitive and wiggly motion. Because predator fish are often trigged by the unexpected sideways motions and jerks that small fish often perform, strikes on traditional lures occur much less often, unless water currents give the lure small pushes or if the predator fish are really biting.

One example of a patented wobbler with the above mentioned problems consists for example of a design described in U.S. Pat. No. 4,807,388. U.S. Pat. No. 4,807,388 describes a variant of a wobbler which includes a dive lip that is permanently mounted to the body of the wobbler. The point of attachment for the fishing line may however be varied. The design according to U.S. Pat. No. 4,807,388 differs from the present invention's design to a significant extent.

U.S. Pat. No. 7,107,720 also describes a variant of a fishing lure of the wobbler type which includes a lip with an angled shape. The design differs significantly from the design in accordance with the present invention.

Devices intended to create a greater variation in the movement of lures (bait) have been conceived in several different variants. For example, discs in a round bowl-like shape are previously known. The discs, attached at a distance from body of the lure (bait), cause the lure to vibrate or give the lure (bait) a rocking movement in all directions. The design does not provide a corresponding effect in comparison to the present design if it is attached to a fishing lure. For example, the design does not give the lure (bait) a swim-like progressive motion. The attachment of the discs directly in front of a wobbler gives it shaky motion in the forward direction.

Another variant of a disc is marketed under the brand name of Lureimprover. The design is designed to be attached at least 15 to 200 centimeters from the body of the lure. However, Lureimprover's design differs significantly from the design in accordance with the present patent application. During tests of the design, it has been shown that problems arise if it is attached in direct proximity to the body of the wobbler. For example, the wobbler receives an uncontrollable rotation if Lureimprover is directly attached to the wobbler (body of the lure) in a similar manner as with the present design.

There exist different types of surface lures on the market, among which are so called poppers. The front surface of these lures often has a concave shape that is almost vertical. One version of this type of lure, marketed under the name of Creek Chub Knuckle-Head, even has an articulated head. In other respects the design differs significantly from the present patent application. The design is plagued by the problem of it not having a satisfactory swim-like motion with an incorporated irregularity in its swimming movement.

An additional problem when fishing with real (live or dead) baitfish is the application of the bait to the fishing lure, or the baitfish attachment device. Difficulty exists in baiting the fishing lure in an efficient and reliable manner. Variants of baitfish attachment devices are described in GB745508, DE1020010047372 and U.S. Pat. No. 2,836,922.

PURPOSE OF THE INVENTION

The main purpose of the present patent application is to create a guide lip which is intended to be loosely attached to, or loosely integrated with, a fishing lure or a lure body (baitfish) giving for example a wobbler a more fish-like motion that is irregular. Loosely attached means that the guide lip is attached with an articulated attachment, so that the lure is able to move/rock (wiggle), especially the front part that meets the water. Another purpose of the present design is to create a guide lip which is cost effective to manufacture. A further purpose of the present design is to create a guide lip with an attachment which for example may consist of a fish head. Yet another purpose of the present design is to create a guide lip that includes an attached device for baitfish. A still further purpose of the present design is to create a guide lip that is intended to be attached a short distance ahead of a fishing lure, lure body or baitfish. An additional purpose of the present design is to create a guide lip that is intended to be attached in a position that is essentially upside down in relation to the first embodiment.

BRIEF DESCRIPTION OF THE DRAWINGS

In the following detailed description of the present invention, reference and references to the following figures will occur. These figures are briefly described in the following figure list.

FIGS. 8A, 8B and 8C show a guide lip which includes an attachment which may for example consist of a part that resembles a fish head.

DETAILED DESCRIPTION OF THE INVENTION

Figure 1:
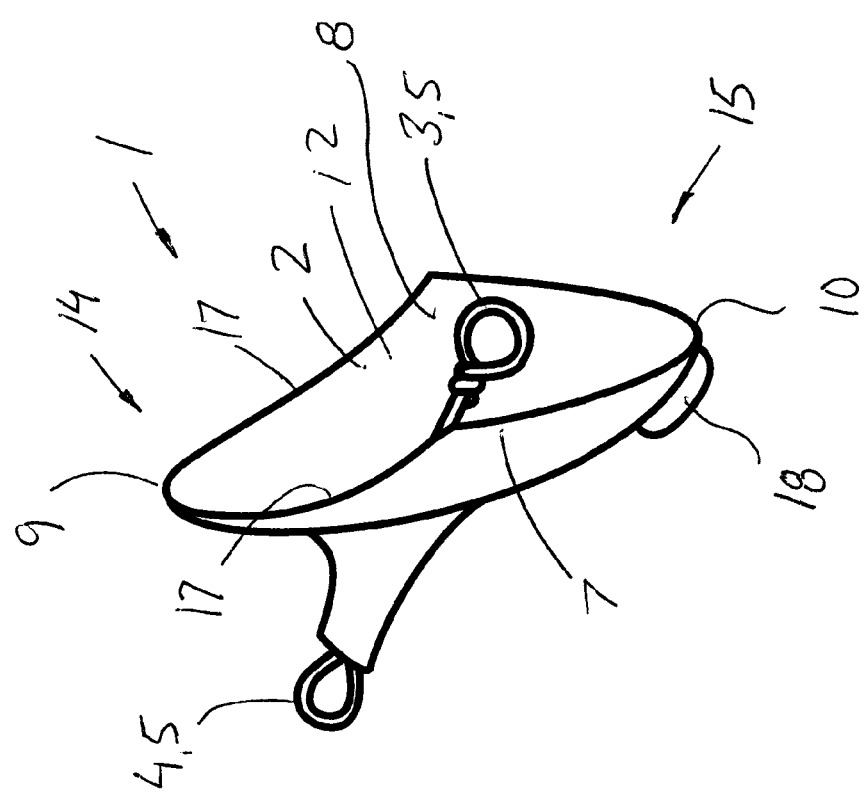
FIG. 1 shows a first embodiment of the present guide lip in perspective diagonally from the front.

Referring to the figures, a guide lip 1 in accordance with the present patent application is shown. The guide lip 1 is preferably designed to be used in conjunction with fishing and the like. Preferably, the guide lip 1 is designed to be used attached (connected) to, or form a part of, various types of fishing lures such as for example fishing lures of the types known as spoon lures, wobblers (plugs) or similar. In alternative embodiments, however, the guide lip may be connected (attached) to other types of fishing lures, fishing baits (baitfish) or be used in other ways in connection with fishing.

The guide lip 1 consists of a spoon-shaped body 2, one first (front) attachment device 3 and one second (rear) attachment device 4. The first attachment device 3 is intended to be connected (attached) to a fishing line directly, or indirectly via at least one swivel with tackle or the like, connected to a fishing pole's fishing reel or the like. The second attachment device 4 is intended to be connected to a baitfish, fishing lure or similar. Attachment device 3 and attachment device 4 may be comprised of a loop 5 or another for the purpose suitable attachment device or connection member.

The first attachment device 3 and the second attachment device 4 form a conceived axle 6, (axial center, tensile center) through the guide lip. The main direction of the guide lip's movement in the water, in the guide lip's direction toward the pulling source/the point that pulls the lure forward is created during use of the guide lip.

Figure 2:
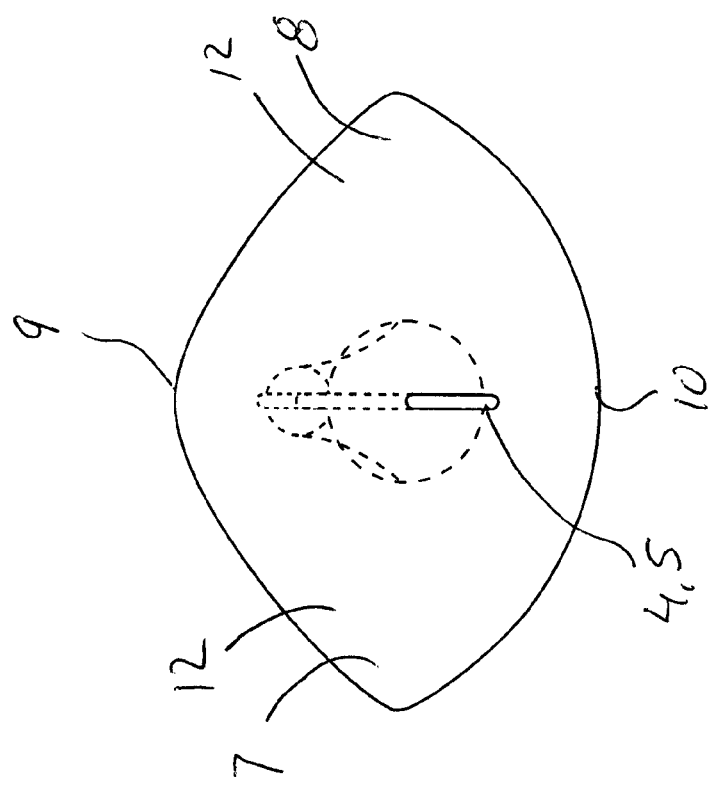
FIG. 2 shows the first embodiment of the guide lip straight from the front.

With reference to FIGS. 1 and 2, a first embodiment of the present guide lip 1 is shown. The guide lip according to this embodiment is, during use attached to a lure's loop or the like, moveably arranged in relation to the lure body, for example a wobbler's body, in both the vertical and lateral direction.

The spoon-shaped body's 2 form may vary within the scope of the present patent application. In the exemplifying embodiment, the spoon-shaped body's form consists of a hybrid between a disc and an angled lip. The spoon-shaped body's 2 form is preferably bowl-shaped (spoon-shaped) which includes curved, arch-shaped surfaces or the like in the adjacent areas to the attachment device 3. The spoon-shaped body is comprised of one first wing 7 located on one side of guide lip's center line and one second wing 8 which is located on the other side of guide lip's center line. The spoon-shaped body further includes a water conveying edge 9, from which the majority or the essential majority, of the water conveyed (directed) by the guide lip, essentially leaves the guide lip's 1 spoon-shaped body 2. The spoon-shaped body further includes an opposite edge 10 in relation to the water conveying edge 9. The guide lip 1 is formed in such a way that when it moves, through the water, the greater part (bulk) of the water is directed (guided) over the spoon-shaped body 2 or, in the alternative embodiment shown in FIGS. 5 and 6, the bulk of the water is guided (directed) essentially under the spoon-shaped body 2.

Figure 3:
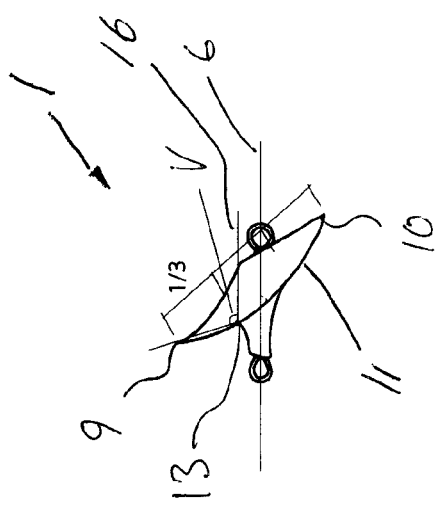
FIG. 3 shows a first embodiment of the guide lip from the side with a definition of the guide lip's angle.

In the exemplifying embodiment of the present invention shown in FIGS. 1 to 3, a spoon-shaped body 2 is shown which in the vertical direction includes at least one curved surface 11 and in the horizontal direction includes at least one curved surface 12. When the guide lip, according to the embodiment, is conveyed through the water, the water is directed (guided) by the spoon-shaped body's 2 form over the spoon-shaped body 2. The form of the spoon-shaped body may vary greatly within the scope of the invention. The curved surfaces may for example be of an elliptical shape, partially spherical shape, radius shape, convex shape or in other ways curved surface or curved surfaces. In alternative embodiments it is conceivable that the guide lip is comprised of sections which are curved and not curved. The guide lip may also include sections which have different levels of curvature. The change of the curvature may be in increments or non-incremental.

Even if the spoon-shaped body's front surface in the first embodiment has a certain shape (contour), see FIG. 2, the form of the contour of the spoon-shaped body's front surface may vary greatly within the scope of the invention. The contour of the front surface may be of a variety of different forms which are suitable for the purpose.

A unique and specific feature of the present guide lip is that the angle of the guide lip is defined by a position 13. It is characterized by an angle between a line 16 that is parallel with the earlier mentioned conceived axle 6 and a line that stretches from the water conveying edge 9 through a point 13 on the guide lip's front side that lies a third of the distance between the water conveying edge 9 and the guide lip's opposite edge 10, as viewed from the water conveying edge 9, being greater than 90 degrees and preferably greater than 95 degrees. In alternative embodiments the angle is greater than 100 degrees. In further alternative embodiments the angle is greater than 110 degrees.

The top edge 14 consists of the edge on the upper half of the guide lip's spoon-shaped body 2. The bottom edge 15 consists of the edge on the lower half of the guide lip's spoon-shaped body 2. The top edge 14 of the spoon-shaped body 2 may completely or partially consist of or include at least one curved section (edge) 17. In the exemplifying embodiment, the edge 14, as seen from the side, forms at least one radius or elliptically formed or in another manner curved (bent) edge 17.

With reference to FIGS. 1 and 2 it is shown how the guide lip 1 may include at least one weight 18 sinker or the like. The guide lip may even exclude a weight. The weight's 18 position may vary within the scope of the invention. In the exemplifying embodiment, the weight 18 is attached to the spoon-shaped body's 2 bottom edge 15 or in the vicinity of the bottom edge 15. The weight's position in alternative embodiments may be adjustable. Furthermore, the weight 18 may be arranged to be removable so that the user may choose to use the guide lip with or without weight and in alternative embodiments with different heaviness of the weight or weights. Heaviness regulates the guide lip's motion, heavier weight produces a more stable movement.

The guide lip's 1 spoon-shaped body 2 is preferably manufactured of a polymeric material. In alternative embodiments, it is however conceivable that the guide lip's 1 spoon-shaped body 2 be made of another for the purpose suitable material such as some type of metal, metal alloy or another for the purpose suitable material or combination of materials.

Figure 4:
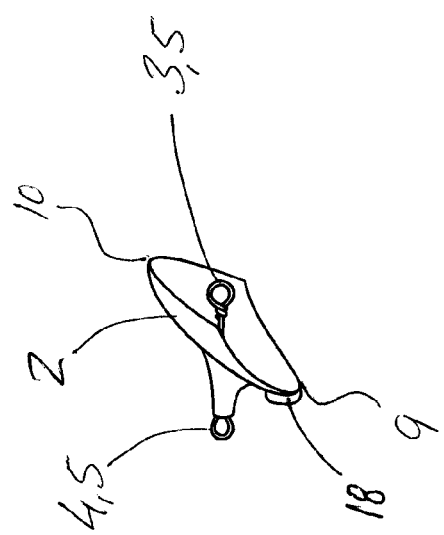
FIG. 4 shows an alternate embodiment of the present invention.
Figure 5:
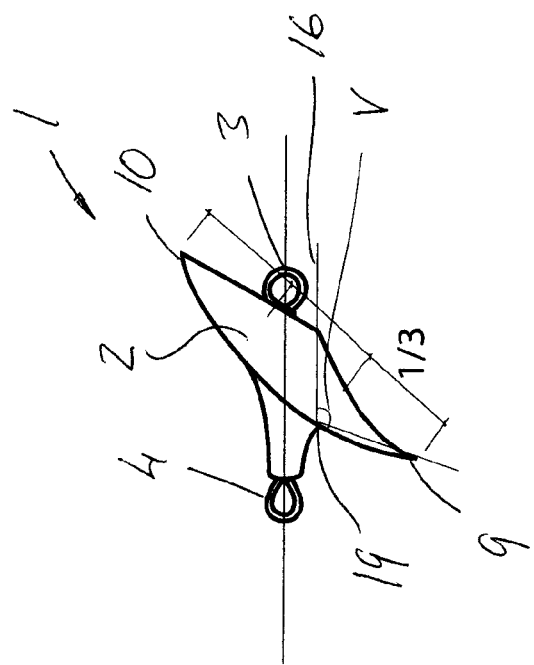
FIG. 5 shows an alternate embodiment of the guide lip as seen from the side with a definition of a guide lip's angle.

With reference to FIGS. 4 and 5, an alternative embodiment of the present guide lip is shown. In this embodiment, the guide lip is essentially turned half a rotation in relation to the first exemplifying embodiment. In this embodiment, the guide lip essentially directs the water under the guide lip's spoon-shaped body 2. A guide lip with attached bait, according to this embodiment, strives when used to move toward the water's surface. The guide lip's angle may be defined from a position 19 found a third of the distance from the spoon-shaped body's 2 water conveying edge 9, in the embodiment consisting of a bottom edge 15 in the direction toward the opposite edge 10, in the embodiment consisting of a top edge 14. At this position 19 the angle V between a conceived line that stretches between position 19 and the water conveying edge 9 and a conceived line 16 that is parallel with the axle's 6 axial direction is greater than 90 degrees and preferably grater than 95 degrees. In alternative embodiments the angle is greater than 100 degrees. In further alternative embodiments the angle is greater than 110 degrees. In yet further alternative embodiments the angle is greater than 120 degrees. A greater angle V provides for a smoother swimming motion.

Even in this embodiment, the guide lip 1 may include at least one weight 18, sinker or similar. The guide lip may also exclude a weight. The weight's 18 position may vary within the scope of the invention. In the exemplifying embodiment, the weight 18 is attached to the spoon-shaped body's 2 bottom edge 15 or in the vicinity of the spoon-shaped body's 2 bottom edge 15. The weight's position in alternative embodiments may be adjustable. Furthermore, the weight 18 may be arranged to be removable so that the user may choose to use the guide lip with or without weight and in alternative embodiments with different heaviness of the weight or weights.

Figure 6:
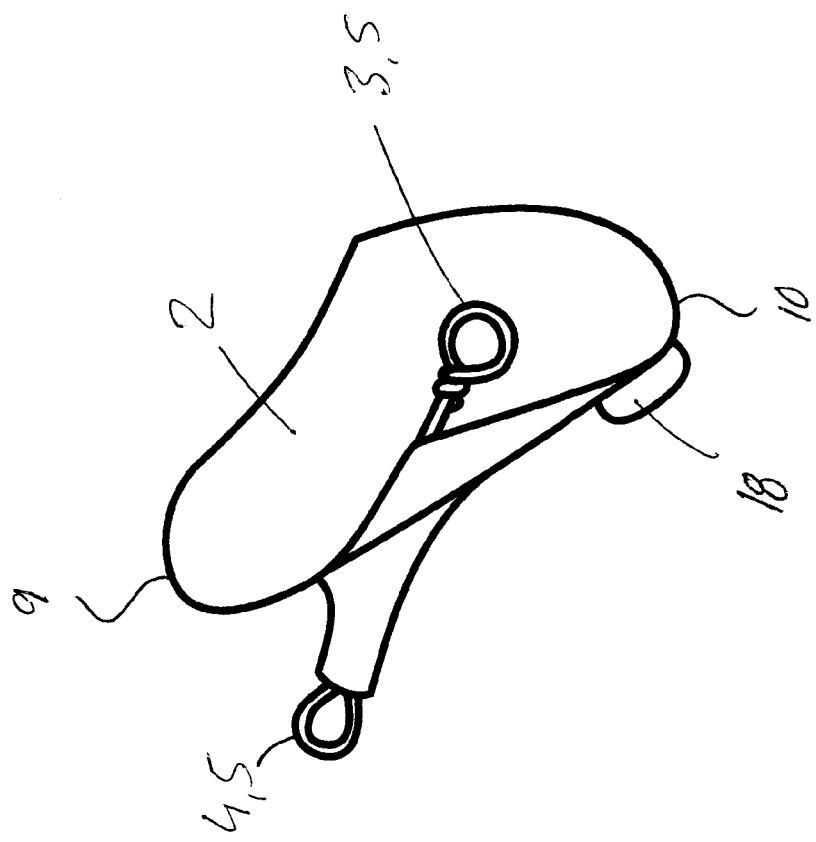
FIG. 6 shows a guide lip with an alternative form of the spoon-shaped body.

With reference to FIG. 6, an alternative embodiment of the guide lip is shown where the spoon-shaped body's surface has a form that essentially corresponds to the form of a fractional section of a cylinders internal surface. In alternative embodiments of the design in accordance with FIGS. 4 and 5, where the water is directed under the guide lip, the spoon-shaped body may have a shape the corresponds to the shape of fractional section of a cylinders internal surface.

The spoon-shaped body's surface has a surface that essentially corresponds to the form of a fractional section of a cylinders internal surface. The spoon-shaped body may even be used in a guide lip that directs the water under the lip in a similar manner as is shown in FIGS. 5 and 6.

Figure 7:
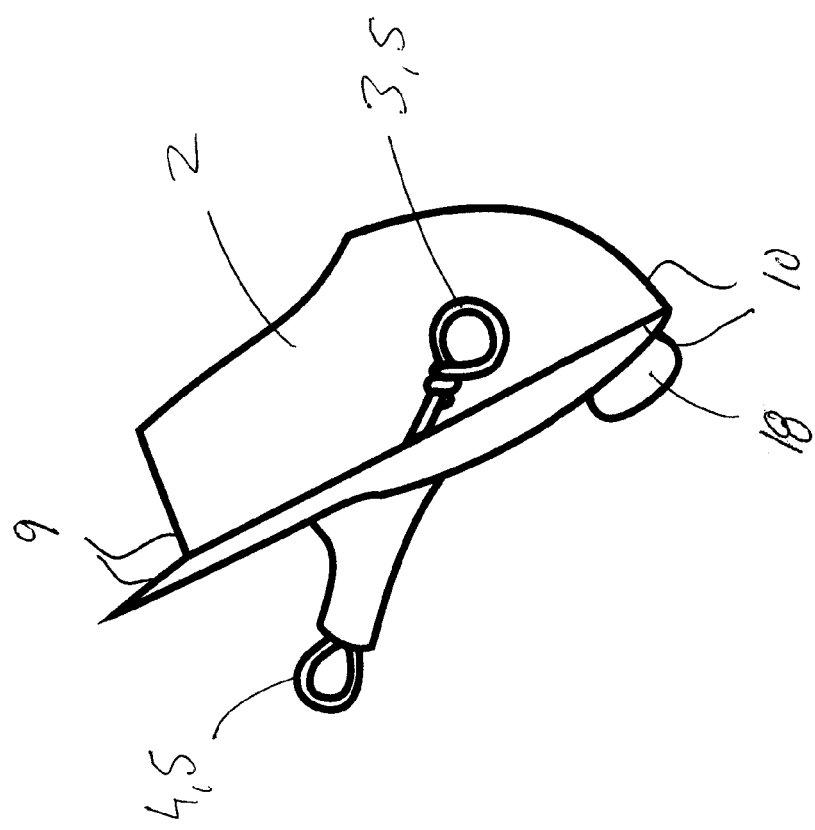
FIG. 7 shows a variant of a guide lip with an alternative variant of the spoon-shaped body.

With reference to FIG. 7, it is shown how the guide lip has a V-shape which stretches from the bottom edge to the top edge of the lip. The angle of the V-shape may vary within the scope of the invention. The essentially V-shaped design may even be used in a guide lip that directs the water under the lip in a similar manner as is shown in FIGS. 5 and 6.

Figure 8B:
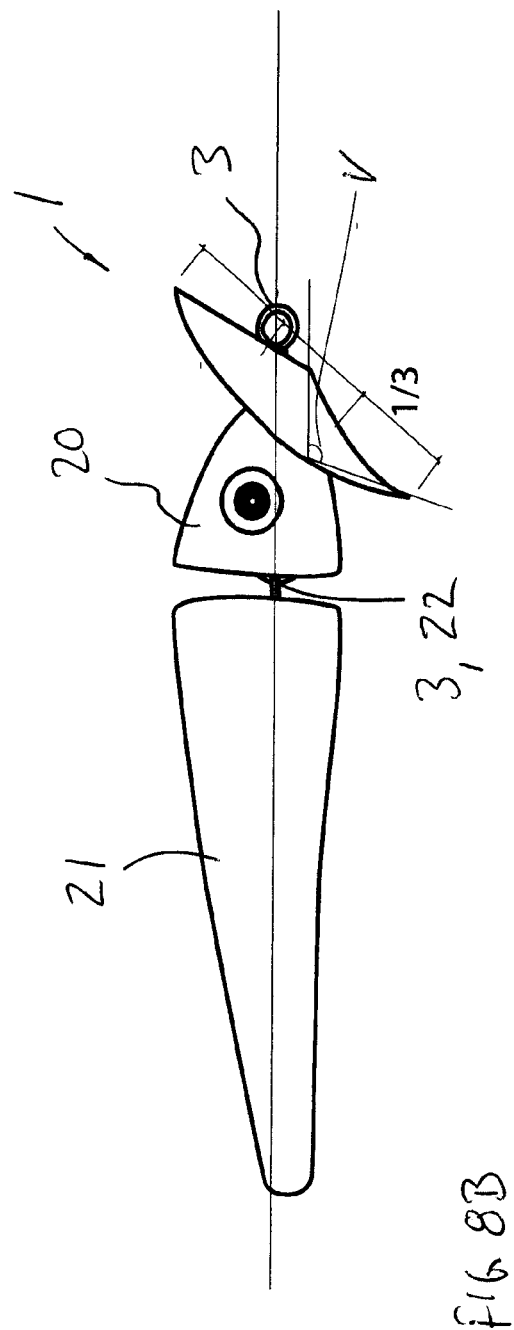

With reference to FIGS. 8A, 8B and 8C, it is shown how the guide lip may include an add-on (accessory, appendage) 20. The add-on 20 may consist of a part of the bait body such as for example a complete head or a partial head. Further, the guide lip with the add-on is preferably movably connected both horizontally and vertically to the rest of the bait body 21. The design in accordance with this embodiment becomes a part of the fishing lure such as for example a wobbler. A unique feature of this embodiment is that the guide lip with the add-on is essentially moveable in several directions around the point of attachment (center of rotation) 22. In alternative embodiments it is conceivable that the guide lip with the add-on is arranged to be movable around an axis of rotation. The guide lip stretches higher up than the bait body's center line 6. Everything that directs the water is considered as the guide lip, even for example the parts of the add-on (head shape) that are above the guide lip and which have a form that directs (guides, steers) the water in accordance with the claims.

With reference to FIG. 8C, it is shown that the spoon-shaped body 2 according to FIGS. 8A and 8B in an alternative embodiment, preferably has a width 23 which is at least 30 percent wider than the add-on form/fish head on the guide lip (measured furthest to the rear of the form/fish head, along its thinnest stretch). In further alternative embodiments the width 23 of the spoon-shaped body is preferably at least 40 percent wider than the add-on form/fish head on the guide lip (measured furthest to the rear of the form/fish head, along its thinnest stretch). In still further alternative embodiments the width 23 of the spoon-shaped body is preferably at least 50 percent wider than the add-on form/fish head on the guide lip (measured furthest to the rear of the form/fish head, along its thinnest stretch). In yet further alternative embodiments the width 23 of the spoon-shaped body is preferably at least 100 percent wider than the add-on form/fish head on the guide lip (measured furthest to the rear of the form/fish head, along its thinnest stretch). The guide lip's sideways movement becomes greater with a wider lip. Alternatively, the form/head may be shorter (measured from furthest to the rear of the actual guide lip, that is the part that directs the water to the form's/head's hindmost part) than its width and shorter than its height. The guide lip's form, the part that directs the water, stretches above the bait body's center axis. The guide lip may consist of one or several different types of material.

Figure 9A:
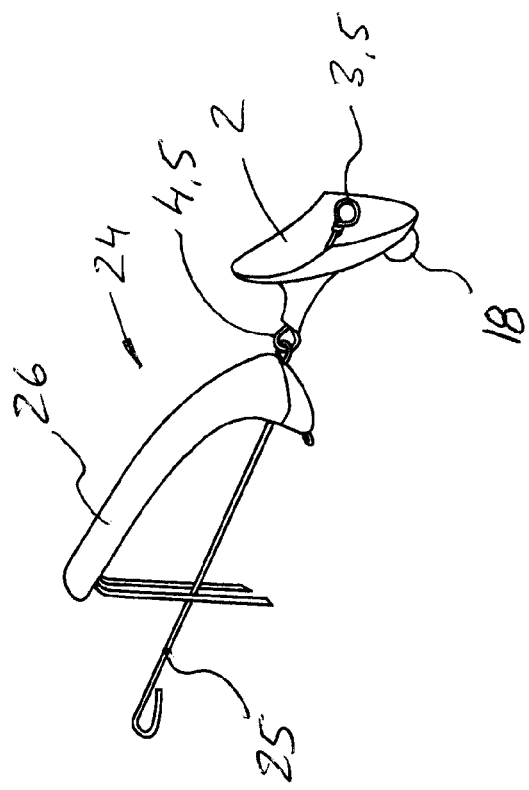
FIGS. 9A and 9B show an example of a device for attaching baitfish to the guide lip.
Figure 9B:
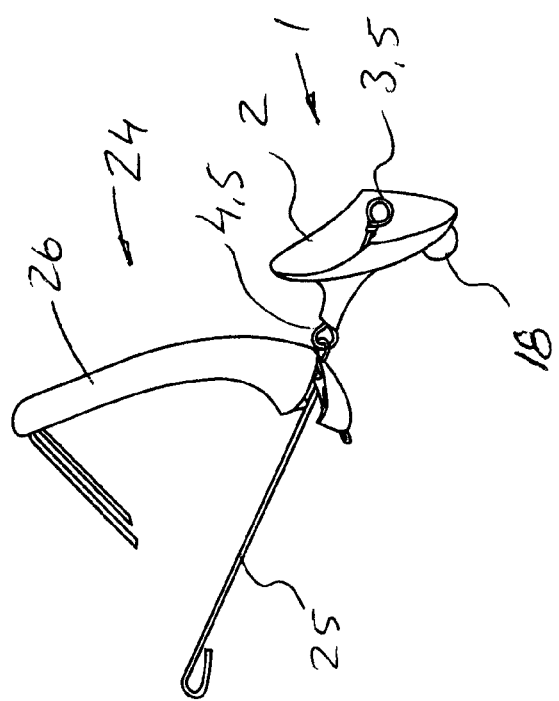

With reference to FIGS. 9A and 9B, an alternative embodiment of the present invention is shown where it includes a device 24 with which baitfish may be attached to the guide lip 1. In order to securely hold the baitfish, the device 24 itself includes principally at least one first part 25 and at least one second part 26. The first part 25 in the exemplifying embodiment consists of straight stiff wire, which in its free end includes a bent section that is inserted into the baitfish through the mouth and the other end of the wire ends in the lower part of a hinge.

The second part 26 consists of two V-shaped hooks assembled in parallel, their one ends being pressed down into the neck of the baitfish until the V-hooks second "leg" lies flat against the head of the baitfish. The V-hooks second "leg" stretches from the point of attachment in the neck of the baitfish to its mouth where the "leg" ends in the upper part of a hinge. The two parts are assembled together in the hinge that is placed in front of the mouth of the baitfish. A nose loop is mounted under the hinge in which the movable guide lip is mounted.

Figure 10A:
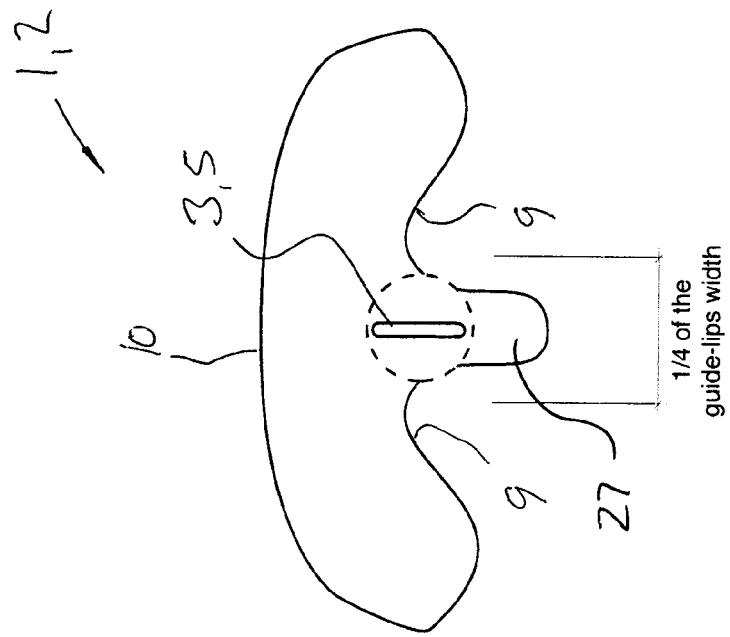
FIGS. 10A and 10B show another alternative embodiment of the guide lip's spoon-shaped body.
Figure 10B:
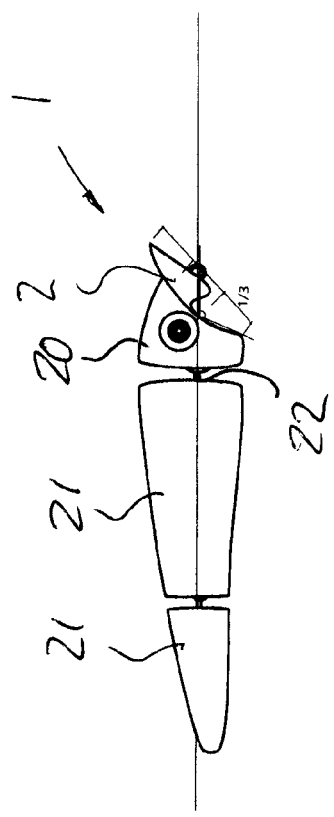

In alternative embodiments, as for example shown in FIGS. 10A and 10B, the guide lip's spoon-shaped body may include at least one segment (piece) 27 that may deviate from previously specified angle requirements. If the segment/piece is smaller than one-fourth of the width of the entire water conveying edge, the angle V is calculated from where the water conveying edge has its largest angle and consequently where the largest volume of water leaves the lip. The surface of the lip that conveys the most water has the greatest affect on the guide lip's action and is therefore important for the definition of angle V. Previously mentioned embodiments may also include protruding segments which in a corresponding manner deviate from the earlier stated angle requirements.

Figure 11A:
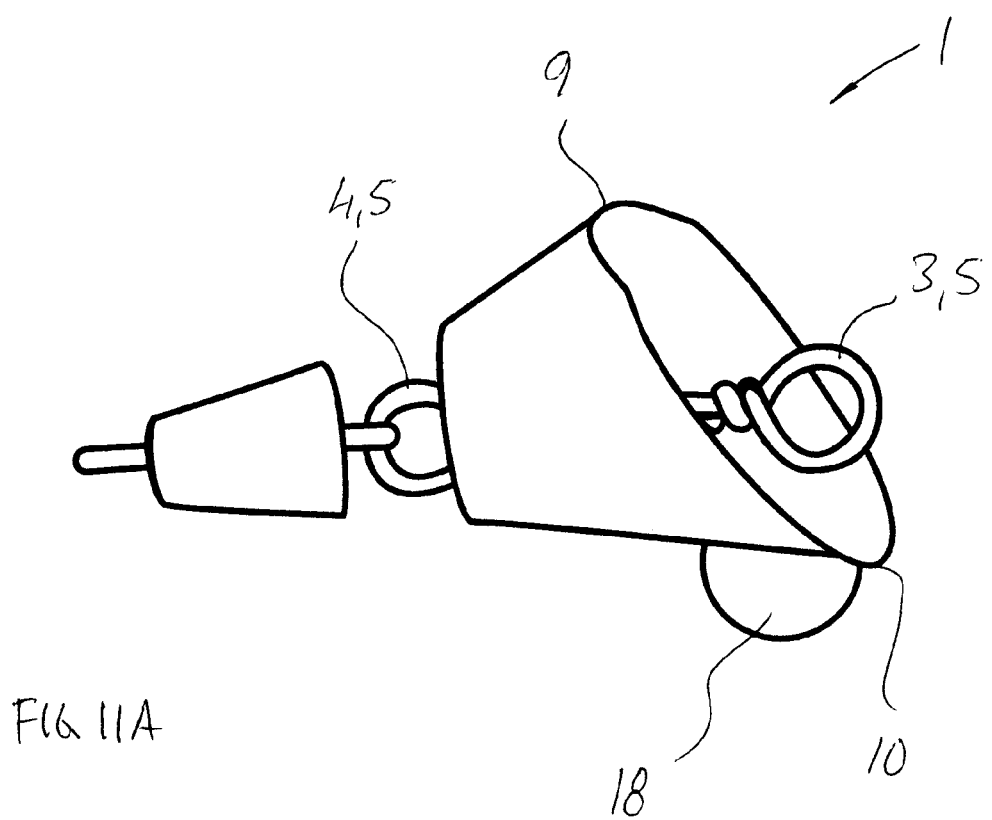
FIGS. 11A and 11B show an alternative embodiment of the guide lip that is especially suitable to use when attached to a spoon lure.
Figure 11B:
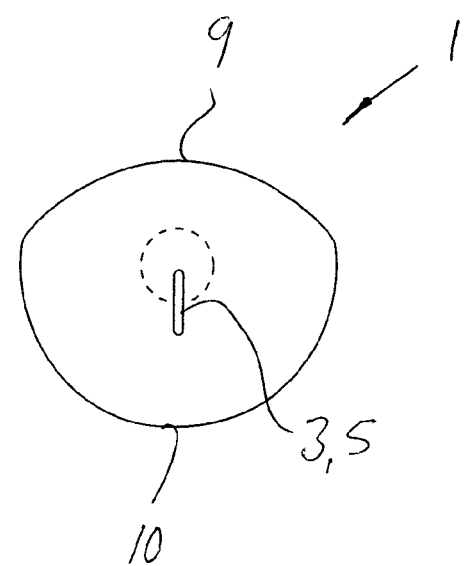

With reference to FIGS. 11A and 11B, another alternative embodiment is shown. This embodiment may be especially suitable to use in combination with spoon lures and fusiform bait. It is however conceivable that the embodiment be used with other types of fishing bait.

In the detailed description of the present invention, design details may have been omitted which are apparent to persons skilled in the art in the field of the device. Such obvious design details are included to the extent necessary so that the proper and full performance of the present invention is achieved.

Even if certain preferred embodiments have been described in detail, variations and modifications of the method and device may become apparent for specialists in the field of the invention. All such modifications and variants are regarded as falling within the scope of the following claims. For example, in alternative embodiments it is conceivable that the guide lip only moves around one axis of rotation in relation to the bait, such as the bait body. The axis of rotation may be positioned in an essentially vertical direction or be positioned in another for the purpose suitable direction.

In alternative embodiments, it is conceivable that the present invention be defined as a type of fish bait (fishing lure) or similar which includes a guide lip that is movably connected to an axis of rotation (center of rotation, a point of attachment) to at least one bait body. Alternatively, the guide lip may move around an axis of rotation in relation to the bait body. The axis of rotation may be positioned in an essentially vertical direction or be positioned in another for the purpose suitable direction.

In further alternative embodiments, it is conceivable that the spoon-shaped body's surface in the forward direction is completely or partially provided with a texture.

ADVANTAGES OF THE INVENTION

The present invention achieves several advantages. Firstly, the present guide lip creates a better fish-like motion in the water. A very significant difference from other types of bait is that the loosely connected guide lip in principle creates its own pattern of movement, that which is attached behind the lip may wiggle, twist or in another way move but follows the guide lip's maneuvers. The guide lip has its own balance/unbalance that allows for the actual angle to continually change. This generates a pattern of movement that continually renews itself within a certain given range. Another advantage of the present invention is that it may be manufactured in a cost efficient manner.

What is claimed is:

1. A guide lip to be connected with an articulated point of attachment to a fishing lure, lure body, or baitfish, the guide lip comprising:
    a spoon-shaped body having a front surface, the front surface to face in a direction toward a pulling source of the guide lip, a perimeter of the front surface including a water conveying edge;
    a first attachment device arranged on the front surface at a central region of the front surface;
    a second attachment device, the first and second attachment devices forming a conceived axle extending in the direction toward the pulling source of the guide lip;
    a first wing forming part of the front surface adjacent the central region; and
    a second wing forming part of the front surface adjacent the central region opposite the first wing, the first and second wings to extend, in the direction toward the pulling source, in front of the central region where the first attachment device connects to the spoon-shaped body, the first and second wings to direct water in a direction toward the water conveying edge when the guide lip is moving through the water, the water conveying edge being positioned on at least one of a top part of the guide lip above the axle or on a bottom part of the guide lip below the axle, wherein an angle between (1) a line that is parallel with the axle and (2) a line that stretches from the water conveying edge and through a point on a front side of the guide lip positioned approximately one-third a distance between the water conveying edge and an opposite edge, as seen from the water conveying edge, is greater than 90 degrees.

2. The guide lip of claim 1, wherein the spoon-shaped body directs a greater part of the water over the water conveying edge during use.

3. The guide lip of claim 1, wherein the spoon-shaped body directs a greater part of the water under the water conveying edge during use.

4. The guide lip of claim 1, wherein the front surface corresponds to a spherical or concave surface.

5. The guide lip of claim 1, further comprising a weight positioned adjacent the water conveying edge or in a vicinity of the water conveying edge.

6. The guide lip of claim 1, wherein the guide lip's form corresponds to a fractional section of a cylinder.

7. The guide lip of claim 1, wherein the guide lip has a V-shape.

8. The guide lip of claim 1, further comprising an add-on.

9. The guide lip of claim 7, wherein the guide lip has a width which is at least 30 percent wider than a width of an add-on part.

10. The guide lip of claim 1, wherein the guide lip is connected to an attachment device for baitfish.

11. The guide lip of claim 8, wherein the add-on corresponds to a head to a wobbler's body.

12. The guide lip of claim 1, further comprising an attachment device for baitfish.

13. The guide lip of claim 1, wherein the first and second attachment devices protrude out from the spoon-shaped body in opposite directions in alignment with the axle.

14. The guide lip of claim 1, wherein the first attachment device is connected to the second attachment device by a wire extending through the spoon-shaped body.

* * * * *